(12) United States Patent
Go et al.

(10) Patent No.: US 11,542,871 B2
(45) Date of Patent: *Jan. 3, 2023

(54) INJECTION NOZZLE, COMBUSTOR INCLUDING SAME, AND GAS TURBINE INCLUDING SAME

(71) Applicant: DOOSAN ENERBILITY CO., LTD, Changwon (KR)

(72) Inventors: Young Gun Go, Yongin (KR); Hyun Soo An, Yongin (KR)

(73) Assignee: DOSAN ENERBILITY CO., LTD., Changwon (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/561,963

(22) Filed: Dec. 26, 2021

(65) Prior Publication Data
US 2022/0243661 A1    Aug. 4, 2022

(30) Foreign Application Priority Data
Feb. 3, 2021    (KR) .................. 10-2021-0015390

(51) Int. Cl.
*F23R 3/00* (2006.01)
*F23R 3/28* (2006.01)
*F23D 14/64* (2006.01)
*F02C 7/232* (2006.01)
*F23D 14/82* (2006.01)

(52) U.S. Cl.
CPC .............. *F02C 7/232* (2013.01); *F23D 14/64* (2013.01); *F23D 14/82* (2013.01); *F23R 3/002* (2013.01); *F23R 3/28* (2013.01); *F05D 2220/32* (2013.01); *F05D 2240/36* (2013.01)

(58) Field of Classification Search
CPC . F02K 3/10; F02K 3/11; F23D 11/406; F23D 14/62; F23D 14/64; F23D 14/82; F23R 3/20; F23R 3/28; F23R 3/286; F23R 2900/03343
See application file for complete search history.

(56) References Cited

U.S. PATENT DOCUMENTS

| 2008/0110173 | A1* | 5/2008 | Bunker | F23D 14/62 60/737 |
| 2013/0167538 | A1* | 7/2013 | Laster | F23R 3/286 60/734 |
| 2017/0370589 | A1* | 12/2017 | Berry | F02C 7/228 |

FOREIGN PATENT DOCUMENTS

| JP | 2019215138 A | * 12/2019 | .............. F23R 3/28 |
| KR | 10-2019-0040666 A | 4/2019 | |

* cited by examiner

*Primary Examiner* — Scott J Walthour
(74) *Attorney, Agent, or Firm* — Harvest IP Law LLP

(57) ABSTRACT

An injection nozzle installed in a combustor of a gas turbine to inject fuel and compressed air into a combustion chamber is provided. The injection nozzle includes an inlet portion into which fuel and compressed air are introduced, an outlet portion disposed downstream of the inlet portion in a flow direction of fluid and configured to discharge the fuel and compressed air to the combustion chamber, and an intermediate portion disposed between the inlet portion and the outlet portion and connected obliquely to each of the inlet portion and outlet portion, wherein each of the inlet portion, the outlet portion, and the intermediate portion has a prismatic shape.

17 Claims, 7 Drawing Sheets

INJECTION NOZZLE, COMBUSTOR INCLUDING SAME, AND GAS TURBINE INCLUDING SAME

CROSS REFERENCE TO RELATED APPLICATION

This application claims priority to Korean Patent Application No. 10-2021-0015390, filed on Feb. 3, 2021, the disclosure of which is incorporated herein by reference in its entirety.

BACKGROUND

1. Field

Apparatuses and methods consistent with exemplary embodiments relate to an injection nozzle, a combustor, and a gas turbine equipped with the same, and more particularly, to an injection nozzle provided in a combustor of a gas turbine to inject fuel and compressed air into a combustion chamber of the combustor.

2. Description of the Related Art

A turbo machine refers to a device that generates a driving force used to generate electric power with fluid (e.g., gas) passing through the turbo machine. Therefore, a turbo machine and a generator are usually used together. The turbo machine may include gas turbines, steam turbines, wind power turbines, and the like. A gas turbine mixes compressed air and natural gas and burns the mixture to generate combustion gas that is used to generate a driving force for the generation of electric power. A steam turbine heats water to generate steam that is used to generate a driving force for the generation of electric power. A wind turbine converts wind power into a driving force for the generation of electric power.

The gas turbine includes a compressor section, a combustor section, and a turbine section. The compressor section includes a plurality of compressor vanes and a plurality of compressor blades alternately arranged in a compressor casing with an air inlet through which air is introduced. The introduced air is compressed by the compressor vanes and the compressor blades while passing through an inside of the compressor section. The combustor section mixes fuel with the compressed air compressed by the compressor section. In addition, the combustor ignites the fuel-air mixture with an igniter to generate high-temperature and high-pressure combustion gas. The generated combustion gas is supplied to the turbine section. The turbine section includes a plurality of turbine vanes and a plurality of turbine blades alternately arranged in a turbine casing. The combustion gas generated by the combustor rotates the turbine blades while passing through an inside of the turbine section and then is discharged to outside through a turbine diffuser.

The steam turbine includes an evaporator and a turbine. The evaporator generates steam by heating water supplied from the outside. The turbine of the steam turbine includes a plurality of turbine vanes and a plurality of turbine blades alternately arranged in a turbine casing. While the gas turbine uses the combustion gas, the steam turbine uses the steam generated by the evaporator to rotate the turbine blades.

The combustor of the gas turbine includes a nozzle casing, a liner installed downstream of the nozzle casing and having a combustion chamber in which the fuel-air mixture is combusted, a transition piece installed downstream of the liner to supply combustion gas to the turbine section, and an injection nozzle which is installed inside the nozzle casing and discharges the fuel-air mixture to the combustion chamber.

The combustor section of a related art gas turbine is equipped with a plurality of straight tube-type injection nozzles and has a problem in that the flame generated in the combustion chamber or the radiant heat radiating from an inner wall of the combustion chamber is not blocked and is transmitted to a portion of the injection nozzle in which fuel and compressed air are mixed. For this reason, the related art gas turbine undergoes self-ignition in which the fuel-air mixture is spontaneously ignited by the radiant heat transferred to the injection nozzle or a flashback phenomenon in which the flame generated in the combustion chamber flows backward instead of proceeding to the turbine section.

SUMMARY

Aspects of one or more exemplary embodiments provide an injection nozzle capable of preventing flame or radiant heat generated by combustion of a mixture of fuel and compressed air from being transferred to an inner area in which the fuel and compressed air are mixed, a combustor including the injection nozzle, and a gas turbine including the combustor.

Additional aspects will be set forth in part in the description which follows and, in part, will become apparent from the description, or may be learned by practice of the exemplary embodiments.

According to an aspect of an exemplary embodiment, there is provided an injection nozzle including: an inlet portion into which the fuel and the compressed air are introduced; an outlet portion disposed downstream of the inlet portion in a flow direction of fluid and configured to discharge the fuel and compressed air to the combustion chamber; and an intermediate portion installed between the inlet portion and the outlet portion and connected obliquely to each of the inlet portion and the outlet portion, wherein each of the inlet portion, the outlet portion, and the intermediate portion has a prismatic shape.

The intermediate portion may be formed such that an inner width thereof increases toward a downstream side.

When one of directions perpendicular to the flow direction of the fluid flowing through the outlet portion is a first direction and a direction opposite to the first direction is a second direction, when directions perpendicular to the flow direction of the fluid in the outlet portion and perpendicular to the first and second directions are third and fourth directions, respectively, the intermediate portion may be formed such that an inner width thereof in the first and second directions increases toward the downstream side and an inner width thereof in the third and fourth directions may be constant or may decrease toward the downstream side.

Among walls defining an inner space of the intermediate portion, when one of the walls is a first intermediate wall and one wall opposite to the first intermediate wall is a second intermediate wall, and among walls defining an inner space of the outlet portion, when a wall connected to the first intermediate wall is a first outlet wall and a wall connected to the second intermediate wall is a second outlet wall, an angle between a first extension line extending from the first outlet wall and the first intermediate may be greater than an angle between a second extension line extending from the second outlet wall and the second intermediate wall.

When one of directions perpendicular to the flow direction of the fluid flowing through the outlet portion is a first direction and a direction opposite to the first direction is a second direction, the intermediate portion may be inclined from the outlet portion toward the second direction, and the first intermediate wall and the second intermediate wall may be a first direction side wall and a second direction side wall of the intermediate portion, respectively.

The outlet portion may have a prismatic shape with a square or rectangular cross section.

When one of directions perpendicular to the flow direction of the fluid flowing through the outlet portion is a first direction and a direction opposite to the first direction is a second direction, and when directions perpendicular to the flow direction of the fluid in the outlet portion and perpendicular to the first and second directions are third and fourth directions, respectively, the outlet portion may be formed such that a width in the first and second directions and a width in the third and fourth directions are different from each other.

The inlet portion, the outlet portion, and the intermediate portion may be each formed such that an inner surface of each corner of a cross section thereof is curved when viewed from the combustion chamber side.

A connected portion between the intermediate portion and the inlet portion and a connected portion between the intermediate portion and the outlet portion may be formed to have a curved surface.

The intermediate portion may be formed such that an inner width thereof increases toward a downstream side.

When one of directions perpendicular to the flow direction of the fluid flowing through the outlet portion is a first direction and a direction opposite to the first direction is a second direction, and when directions perpendicular to the flow direction of the fluid in the outlet portion and perpendicular to the first and second directions are third and fourth directions, respectively, the intermediate portion may be formed such that an inner width thereof in the first and second directions increases toward the downstream side and an inner width thereof in the third and fourth directions is constant or decreases toward the downstream side.

Among walls defining an inner space of the intermediate portion, when one of the walls is a first intermediate wall and one wall opposite to the first intermediate wall is a second intermediate wall, and among walls defining an inner space of the outlet portion, when a wall connected to the first intermediate wall is a first outlet wall and a wall connected to the second intermediate wall is a second outlet wall, an angle between a first extension line extending from the first outlet wall and the first intermediate may be greater than an angle between a second extension line extending from the second outlet wall and the second intermediate wall.

When one of directions perpendicular to the flow direction of the fluid flowing through the outlet portion is a first direction and a direction opposite to the first direction is a second direction, the intermediate portion may be inclined from the outlet portion toward the second direction, and the first intermediate wall and the second intermediate wall may be a first direction side wall and a second direction side wall of the intermediate portion, respectively.

Each of the inlet portion, the outlet portion, and the intermediate portion may have a prismatic shape.

When one of directions perpendicular to the flow direction of the fluid flowing through the outlet portion is a first direction and a direction opposite to the first direction is a second direction, the intermediate portion is inclined from the outlet portion toward the second direction, and among walls defining an inner space of the intermediate portion, when one of the walls is a first intermediate wall and one wall opposite to the first intermediate wall is a second intermediate wall, and among walls defining an inner space of the outlet portion, when a wall connected to the first intermediate wall is a first outlet wall and a wall connected to the second intermediate wall is a second outlet wall, the first intermediate wall and the second intermediate wall may be a first direction side wall and a second direction side wall of the intermediate, respectively, an inner surface of a connected portion between the first intermediate wall and the first outlet wall may be curved, and an inner surface of a connected portion between the second intermediate wall and the second outlet wall may be curved.

A radius-of-curvature of the inner surface of the connected portion between the first intermediate wall and the first outlet wall may be greater than a radius-of-curvature of the inner surface of the connected portion between the second intermediate wall and the second outlet wall.

According to an aspect of another exemplary embodiment, there is provided a combustor including: a nozzle casing configured to receive compressed air from a compressor and to receive fuel from an outside; a liner disposed downstream of the nozzle casing in a flow direction of fluid and defining a combustion chamber in which a mixture of the fuel and the compressed air is combusted; a transition piece disposed downstream of the liner and configured to supply combustion gas generated in the combustion chamber to a turbine; and an injection nozzle disposed in the nozzle casing to inject the fuel and the compressed air into the combustion chamber. The injection nozzle includes: an inlet portion into which the fuel and the compressed air are introduced; an outlet portion disposed downstream of the inlet portion in the flow direction of fluid and configured to discharge the fuel and compressed air to the combustion chamber; and an intermediate portion installed between the inlet portion and the outlet portion and connected obliquely to each of the inlet portion and the outlet portion, wherein each of the inlet portion, the outlet portion, and the intermediate portion has a prismatic shape.

A connected portion between the intermediate portion and the inlet portion and a connected portion between the intermediate portion and the outlet portion may be formed to have a curved surface.

According to an aspect of another exemplary embodiment, there is provided a gas turbine including: a compressor configured to take in air and to compress the air; a combustor configured to mix fuel with compressed air supplied from the compressor and combust the fuel-air mixture to produce combustion gas; and a turbine rotated by the combustion gas produced by the combustor to generate electric power. The combustor includes: a nozzle casing; a liner disposed downstream of the nozzle casing in a flow direction of fluid and defining a combustion chamber in which the fuel-air mixture is combusted; a transition piece disposed downstream of the liner and configured to supply the combustion gas to the turbine; and an injection nozzle disposed in the nozzle casing to inject the fuel and the compressed air into the combustion chamber. The injection nozzle includes: an inlet portion into which the fuel and the compressed air are introduced; an outlet portion disposed downstream of the inlet portion in the flow direction of fluid and configured to discharge the fuel and compressed air to the combustion chamber; and a connection portion installed between the inlet portion and the outlet portion and connected obliquely to each of the inlet portion and the outlet portion, wherein each of the inlet portion, the outlet portion, and the intermediate portion has a prismatic shape.

A connected portion between the intermediate portion and the inlet portion and a connected portion between the intermediate portion and the outlet portion may be formed to have a curved surface.

The injection nozzle, the combustor including the same nozzle, and the gas turbine including the same combustor according to one or more exemplary embodiments are formed such that the intermediate portion provided between the inlet portion and the outlet portion is connected obliquely to each of the inlet portion and the outlet portion. Therefore, the flame or radiant heat generated in the combustion chamber and introduced into the injection nozzle through the outlet portion of the injection nozzle can be reflected to the combustion chamber from the intermediate portion without reaching the inlet portion in which fuel and compressed air are mixed, thereby preventing autoignition or flash-back that has occurred in combustors.

In addition, according to one or more exemplary embodiments, the inlet portion, the outlet portion, and the intermediate portion constituting the injection nozzle are each designed to have a prismatic shape, for example, a parallelepiped shape having a rectangular or square cross section. Therefore, it is possible to easily manufacture the injection nozzle in which the intermediate portion is connected obliquely to each of the inlet portion and the outlet portion and the inner width of the intermediate portion gradually decreases toward the downstream side. Thus, it is possible to obtain reliably the injection nozzle having a desired shape.

In addition, according to one or more exemplary embodiments, because the inner surface of each corner of the injection nozzle is rounded, it is possible to stabilize the flow of the fluid flowing into the injection nozzle.

In addition, according to one or more exemplary embodiments, because a connected portion between the inlet portion and the intermediate portion and a connected portion between the outlet portion and the intermediate portion are formed to have a curved surface, it is possible to prevent the flow velocity of fluid from being reduced when the flow direction of the fluid is changed at each connected portion, thereby preventing an anchoring phenomenon or a flash-back phenomenon that may occur due to decrease in the flow velocity of the fluid at each connected portion.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
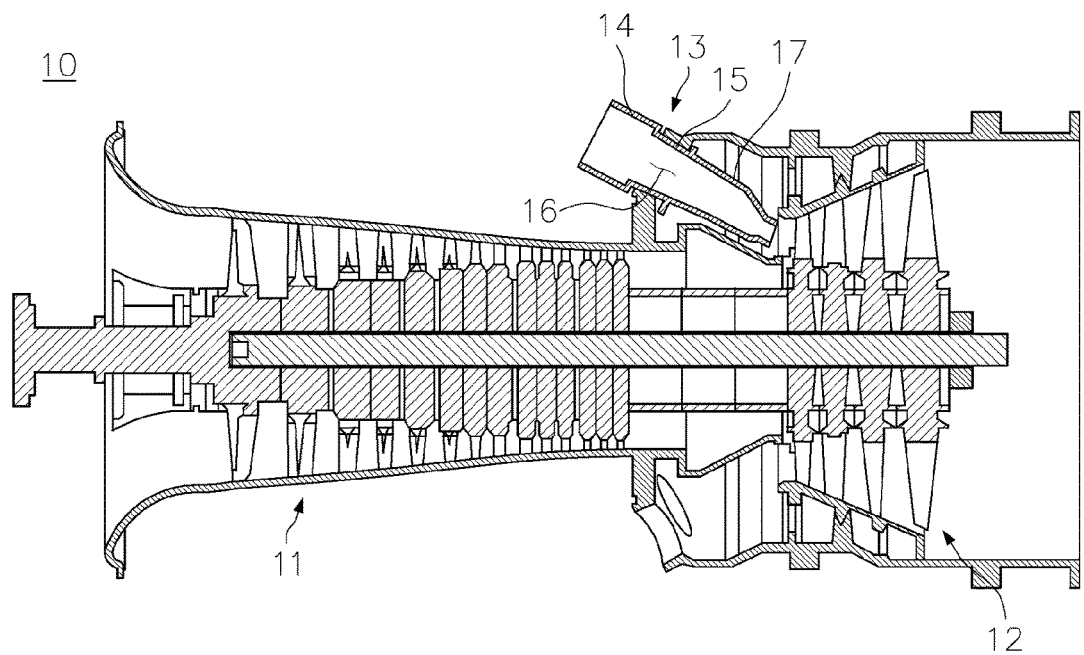
FIG. 1 is a cross-sectional view of a gas turbine according to an exemplary embodiment.

Various modifications and various embodiments will be described with reference to the accompanying drawings. However, it should be noted that the various embodiments are not for limiting the scope of the disclosure to the specific embodiment, but they should be interpreted to include all modifications, equivalents, or substitutions of the embodiments included within the spirit and scope disclosed herein.

Terms used herein are used to merely describe specific embodiments and are not intended to limit the scope of the disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

For clear illustration, components that are irrelevant to the description are omitted, and like reference numerals refer to like components throughout the specification. In certain embodiments, a detailed description of known functions and configurations that may obscure the gist of the present disclosure will be omitted. For the same reason, some of the elements in the drawings are exaggerated, omitted, or schematically illustrated.

Hereinafter, an injection nozzle, a combustor, and a gas turbine including the combustor according to an exemplary embodiment will be described with reference to the accompanying drawings.

FIG. 1 is a cross-sectional view of a gas turbine according to an exemplary embodiment. Referring to FIG. 1, a gas turbine 10 includes a compressor 11, a combustor 13, and a turbine 12. In a flow direction of gas (e.g., compressed air or combustion gas), the compressor 11 is disposed on an upstream side of the gas turbine 10 and the turbine 12 is disposed on a downstream side of the gas turbine 10. The combustor 13 is disposed between the compressor 11 and the turbine 12.

The compressor 11 includes compressor vanes and compressor rotors in a compressor casing. The turbine 12 includes turbine vanes and turbine rotors in a turbine casing. The compressor vanes and the compressor rotors are arranged in multiple stages along the flow direction of compressed air, and the turbine vanes and the turbine rotors are also arranged in multiple stages along the flow direction of combustion gas. The compressor 11 has an internal space of which a volume decreases from a front stage to a rear stage so that the introduced air can be compressed while passing through the inside of the compressor 11, whereas the turbine 12 has an internal space of which a volume increases from a front stage to a rear stage so that the combustion gas supplied from the combustor 13 can expand while passing through the inside of the turbine 12.

In addition, a torque tube serving as a torque transmission member is disposed between the last-stage compressor rotor of the compressor 11 and the first-stage turbine rotor of the turbine 12 to transfer the torque generated by the turbine 12 to the compressor 11. Although the torque tube may include a plurality of torque tube disks arranged in three stages as illustrated in FIG. 1, this is only an example, and the torque tube may include torque tube disks arranged in four or more stages or two or less stages.

The compressor rotor includes a compressor disk and a plurality of compressor blades. A plurality of compressor disks may be disposed in the compressor casing, and each of the compressor disks is fastened by a tie road so as not to be separated from each other in an axial direction of the compressor. That is, the compressor disks are arranged in the axial direction with the tie rod extending through centers of the compressor disks. In addition, adjacent compressor disks are arranged such that opposing surfaces of the adjacent compressor disks are pressed against each other by the tie rod so that the compressor disks cannot rotate relative to each other.

The plurality of compressor blades are radially coupled to an outer surface of each of the compressor disks along a circumferential direction of the compressor disk. For each compressor stage, the plurality of compressor vanes coupled to an inner surface of the compressor casing in the circumferential direction are alternately arranged with the plurality of compressor blades. While the compressor disks rotate along with a rotation of the tie rod, the compressor vanes fixed to the compressor casing do not rotate. The compressor vanes align the flow of compressed air passing through the compressor blades and guide the flow of the compressed air moved from front-stage compressor blades to rear-stage compressor blades. Here, the compressor casing and the compressor vanes may be collectively defined as a compressor stator to be distinguished from the compressor rotor.

The tie rod is installed to extend through the centers of the plurality of compressor disks and the plurality of turbine disks such that one end of the tie rod is fastened to the compressor disk located on the foremost end side of the compressor, and the other end thereof is fastened by a fixing nut.

Because the tie rod may be formed in various structures according to a type of a gas turbine, a shape of the tie rod is not limited to the example illustrated in FIG. 1. There are three types of tie rod including: a single-type in which a single tie rod extends through the centers of the compressor disks and the turbine rotor disks; a multi-type in which multiple tie rods are arranged in a circumferential direction; and a complex type in which the single-type and the multi-type are combined.

Also, the compressor may include a deswirler serving as a guide blade. The deswirler increases a pressure of fluid flowing into the combustor and adjusts a flow angle of the fluid to be substantially equal to a designed flow angle.

The combustor 13 mixes the introduced compressed air with fuel and burns the fuel-air mixture to produce high-temperature and high-pressure combustion gas with high energy, thereby raising the temperature of the combustion gas to a heat-resistant temperature at which components of the combustor and components of the turbine can endure through an isothermal combustion process.

Figure 2:
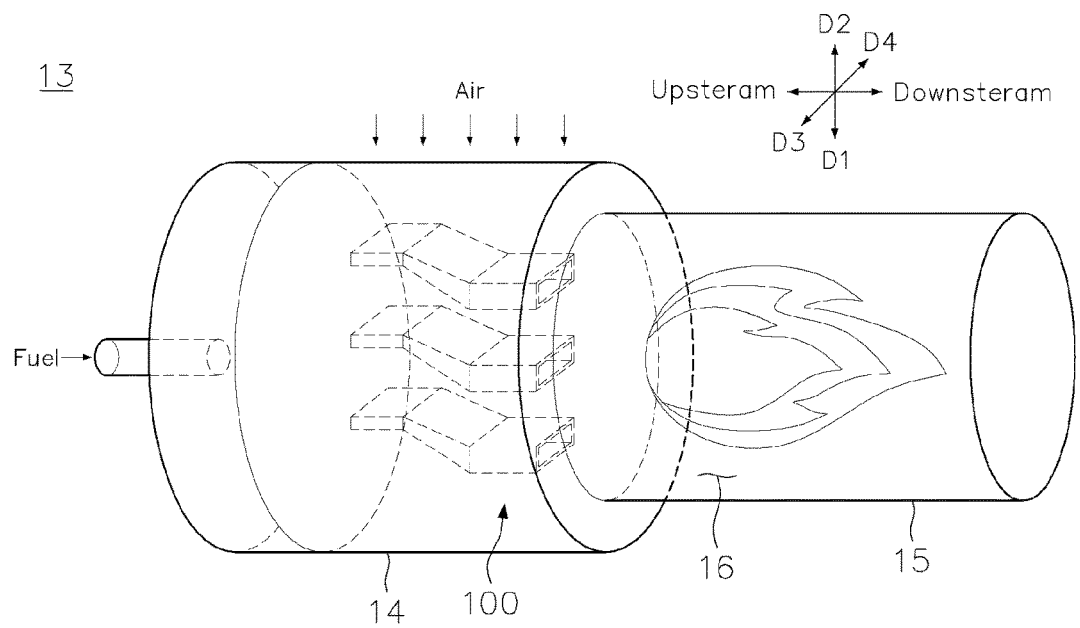
FIG. 2 is a perspective view of a combustor included in the gas turbine of FIG. 1.

FIG. 2 is a perspective view of a combustor included in the gas turbine of FIG. 1. Referring to FIG. 2, a plurality of combustors constituting the combustor 13 may be arranged in a form of a cell in a combustor casing. Each combustor 13 includes a nozzle casing 14, a plurality of injection nozzles 100 accommodated in the nozzle casing 14 to inject fuel, a liner 15 defining a combustion chamber 16, and a transition piece 17 connecting the combustor chamber 16 to the turbine 12.

The liner 15 provides a combustion space in which the fuel and compressed air injected from the injection nozzles 100 are mixed and burned. That is, the liner 15 includes the combustion chamber 16 having a combustion space in which the fuel-air mixture is combusted and an annular liner flow passage that surrounds the combustion chamber 16 to provide an annular space. The plurality of injection nozzles disposed inside the nozzle casing 14 mix the fuel supplied from the outside with the compressed air supplied from the compressor 11 and inject the fuel-air mixture into the combustion chamber 16. The injection nozzle 100 for injecting fuel is installed in front end of the liner 15, and an igniter is installed in a side wall of the liner 15. In addition, a nozzle plate may be installed between the nozzle casing 14 and the liner 15. The nozzle plate separates the combustion chamber 16 from the inner space of the nozzle casing 14 and is installed at the downstream end of the injection nozzle 100 in the flow direction of the fluid.

In the annular liner flow passage, compressed air introduced through a plurality of holes formed in an outer wall of the liner 15 flows, and the introduced compressed air cools the liner 15 while flowing toward the transition piece 17. Because the compressed air flows along the outer wall of the liner 15, it is possible to prevent the liner 15 from being thermally damaged by high temperature combustion gas.

The transition piece 17 is connected to the rear end (i.e., downstream end) of the liner 15 to deliver the combustion gas to the turbine. The transition piece 17 has an annular flow passage surrounding an inner space of the transition piece 17. Compressed air flows through the annular flow passage along the outer wall of the transition piece 17 to cool the outer wall of the transition piece 17, thereby preventing the transition piece 17 from being thermally damaged by high temperature combustion gas.

The high-temperature and high-pressure combustion gas supplied to the turbine 12 expands while passing through the inside of the turbine 12. The expansion of the combustion gas causes impulse and reaction forces with respect to the turbine blades, thereby generating torque. The torque is transferred to the compressor through the torque tube, and an excessive portion of the torque exceeding the driving force required to drive the compressor is used to drive a generator or the like.

The turbine 12 is similar in structure to the compressor 11. That is, the turbine 12 includes a plurality of turbine rotors similar to the compressor rotors of the compressor 11. Each turbine rotor includes a turbine rotor disk and a plurality of turbine blades radially coupled to an outer surface of the turbine rotor disk. The turbine disk and the plurality of turbine blades are designed in a structure in which they are arranged in a multi-stage to be spaced apart from each other along a flow direction of the combustion gas. A plurality of turbine vanes are radially coupled to the inner surface of the turbine casing along the circumferential direction such that each stage of turbine vanes is disposed between adjacent stages of turbine blades to guide a flow direction of the combustion gas passing through the turbine blades. Here, the turbine casing and the turbine vanes may be collectively defined as a turbine stator to distinguish them from the turbine rotor.

Figure 3:
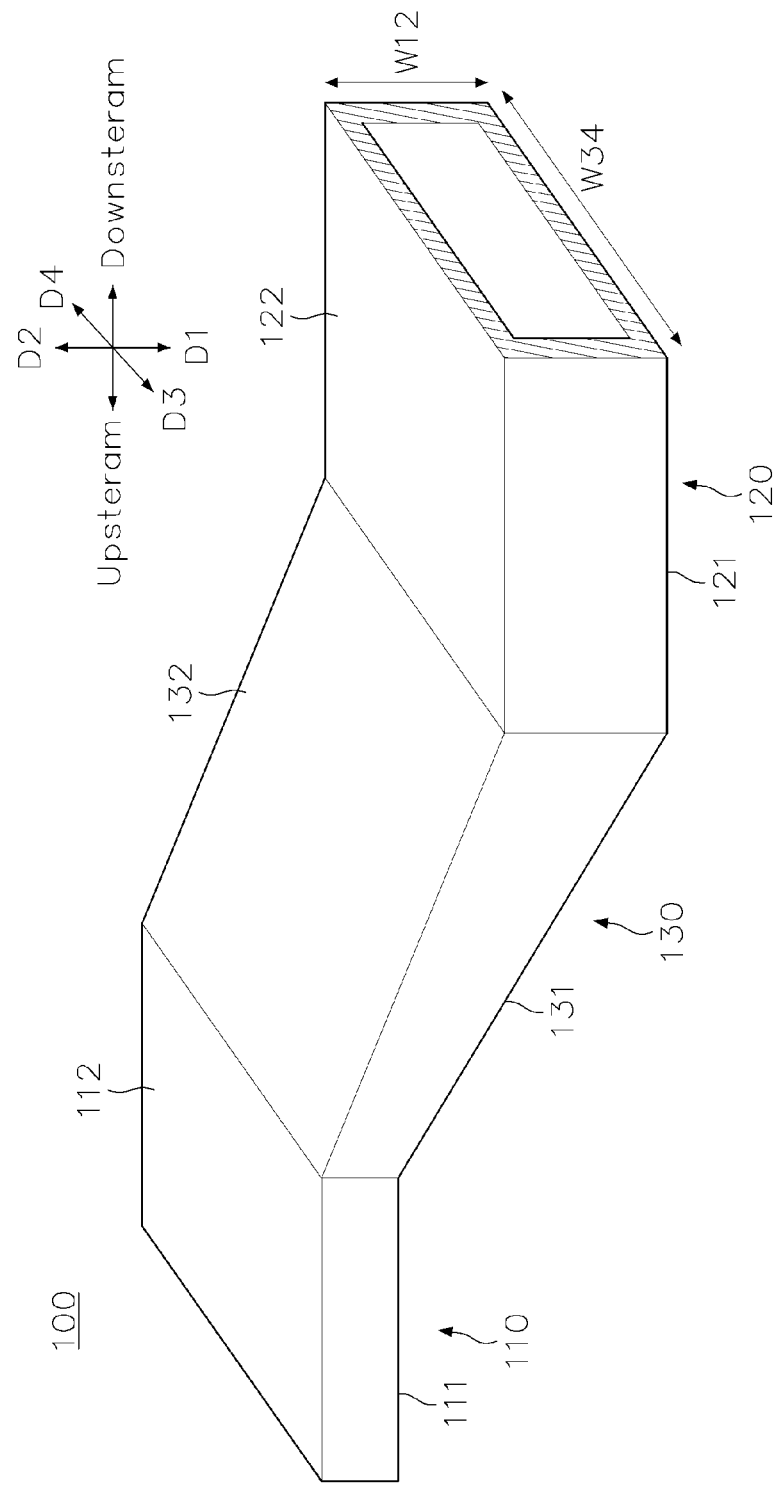
FIG. 3 is a perspective view illustrating an injection nozzle included in the combustor of FIG. 2 according to a first exemplary embodiment.
Figure 4:
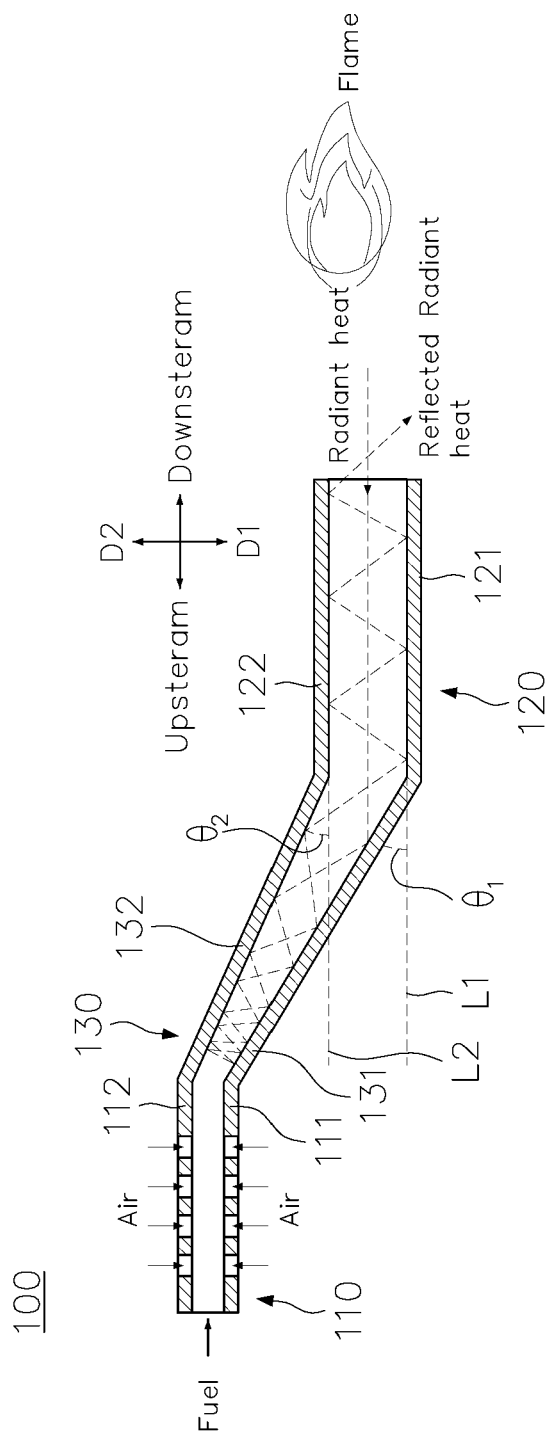
FIG. 4 is a cross-sectional view of the injection nozzle illustrated in FIG. 3.

FIG. 3 is a perspective view illustrating an injection nozzle included in the combustor of FIG. 2 according to a first exemplary embodiment. FIG. 4 is a cross-sectional view of the injection nozzle illustrated in FIG. 3.

Referring to FIGS. 3 and 4, each of the injection nozzles 100 includes an inlet portion 110, an outlet portion 120, and an intermediate portion 130.

Fuel and compressed air are introduced into and mixed in the inlet portion 110. Fuel may be introduced through a main opening of the inlet portion 110, and compressed air may be introduced through a hole formed in a wall of the inlet portion 110. The output portion 120 is installed on a downstream side in the flow direction of fuel-air mixture flowing through the inlet portion 110 to inject the fuel-air mixture into the combustion chamber 16. The intermediate portion 130 is disposed between the inlet portion 110 and the outlet portion 120 and is connected to the inlet portion 110 and the outlet portion 120. The intermediate portion 130 is installed obliquely with respect to each of the inlet portion 110 and the outlet portion 120.

Here, one of a direction perpendicular to the flow direction of the fluid flowing through the outlet portion 120 is referred to as a first direction D1, and a direction opposite to the first direction D1 is referred to as a second direction D2. Among directions defining an inner width of the intermediate portion 130, directions perpendicular to the first and second directions D1 and D2 are referred to as a third direction D3 and a fourth direction D4. That is, the third and fourth directions D3 and D4 are perpendicular to the flow direction of the fluid flowing through the outlet portion 120 and are perpendicular to the first and second directions D1 and D2. The third direction D3 and the fourth direction D4 are opposite to each other.

The intermediate portion 130 is formed in a shape in which an inner width increases toward the downstream side. For example, in the intermediate portion 130, the inner width of the intermediate portion 130 in the first and second directions D1 and D2 increases toward the downstream side, but the inner width of the intermediate portion 130 in the third and fourth directions D3 and D4 is constant or decreases toward the downstream side.

The intermediate portion 130 is inclined toward the second direction D2 from the outlet portion 120. For example, among walls defining the inner space of the intermediate portion 130, one wall is referred to as a first intermediate wall 131 and a wall opposite to the first intermediate wall 131 is referred to as a second intermediate wall 132. In addition, among walls defining the inner space of the outlet portion 120, a wall connected to the first intermediate wall 131 is referred to as a first outlet wall 121 and a wall connected to the second intermediate wall 132 is referred to as a second outlet wall 122. In addition, among walls defining the inner space of the inlet portion 110, a wall connected to the first intermediate wall 131 is referred to as a first inlet wall 111, and a wall connected to the second intermediate wall 132 is referred to as a second inlet wall 112. In this case, the first intermediate wall 131 is disposed in the first direction D1, and the second intermediate wall 132 is disposed in the second direction D2.

Referring to FIG. 4, an angle $\Theta_1$ between a first extension line L1 extending from the first outlet wall 121 and the first intermediate wall 131 is greater than an angle $\Theta_2$ between a second extension line L2 extending from the second outlet wall 121 and the second intermediate wall 132.

If the intermediate portion 130 is designed to have the shape described above, radiant heat generated in the combustion chamber 16 and propagated toward the injection nozzle 100 returns to the combustion chamber 16 by continuously reflecting from the first intermediate wall 131 when reaching the intermediate portion 130. Therefore, according to the exemplary embodiment, it is possible to prevent the transfer of the radiant heat to the inlet portions 110 in which fuel and compressed air are mixed, thereby preventing an autoignition or flash-back phenomenon in the combustor 13.

Referring to FIG. 3, the inlet portion 110, the outlet portion 120, and the intermediate portion 130 are each formed in a prismatic shape, for example, a square column shape. Here, the outlet portion 120 may have a rectangular cross section. In addition, the outlet portion 120 may be formed such that a width W12 in the first and second directions D1 and D2 and a width W34 in the third and fourth directions D3 and D4 are different from each other. For example, the outlet portion 120 may be formed such that the width W34 in the third and fourth directions D3 and D4 is greater than the width W12 in the first and second directions D1 and D2. However, it is understood that this is only an example, and the width W12 of the outlet portion 120 in the first and second directions D1 and D2 may be greater than the width 34 of the outlet portion in the third and fourth directions D3 and D4. In addition, a ratio of the width W12 of the outlet portion 120 in the first and second directions D1 and D2 to the width W34 of the outlet portion 120 in the third and fourth directions D3 and D4 may vary depending on the specifications of the combustor 13.

Figure 5:
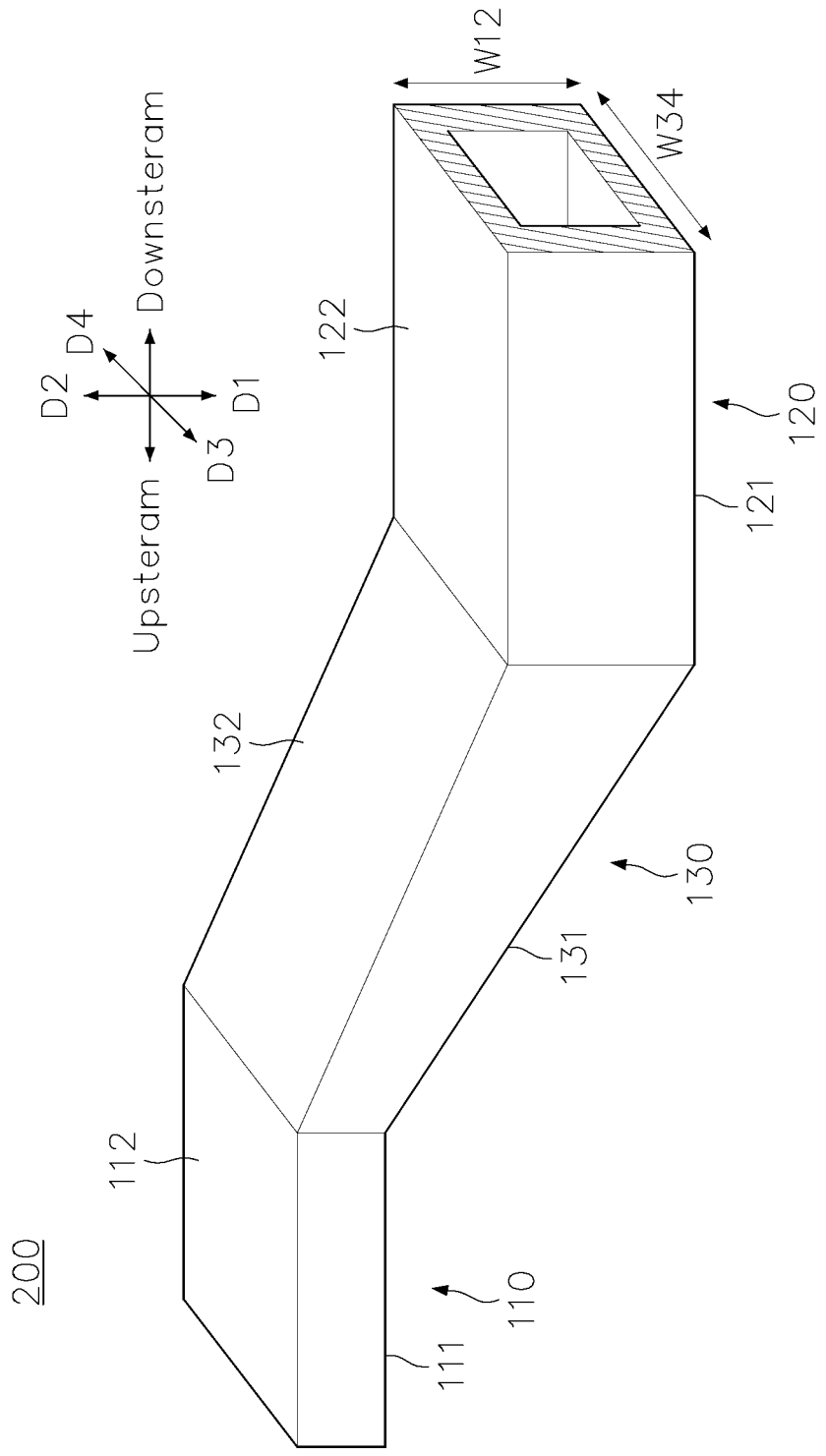
FIG. 5 is a perspective view illustrating an injection nozzle according to a second exemplary embodiment.
Figure 6:
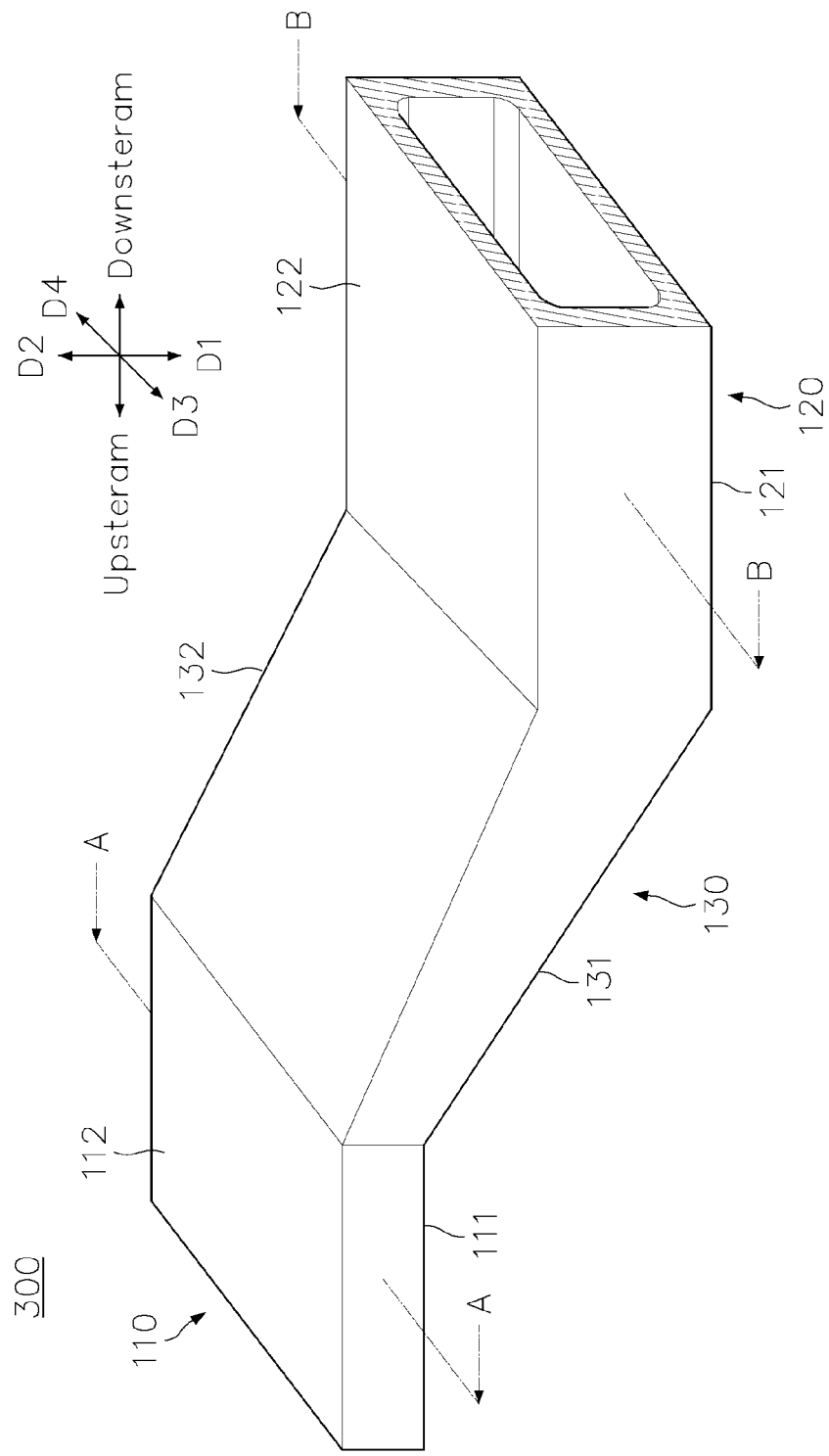
FIG. 6 is a perspective view illustrating an injection nozzle according to a third exemplary embodiment.
Figure 7:
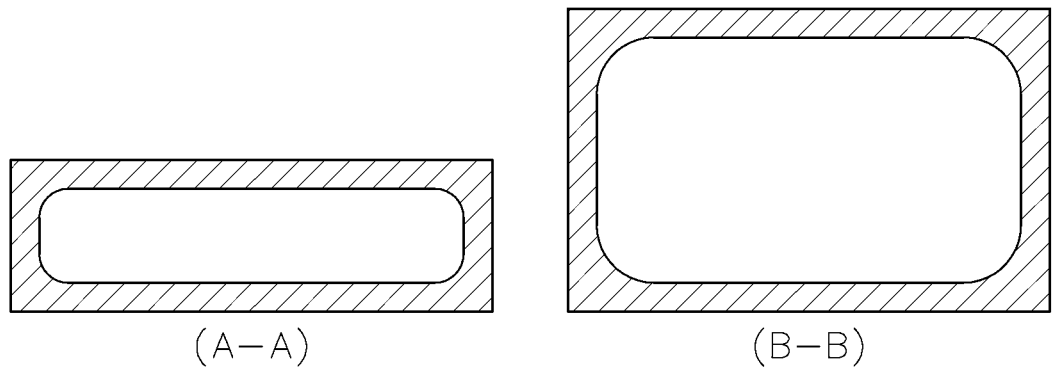
FIG. 7 illustrates cross sections taken along line A-A and line B-B of FIG. 6.
Figure 8:
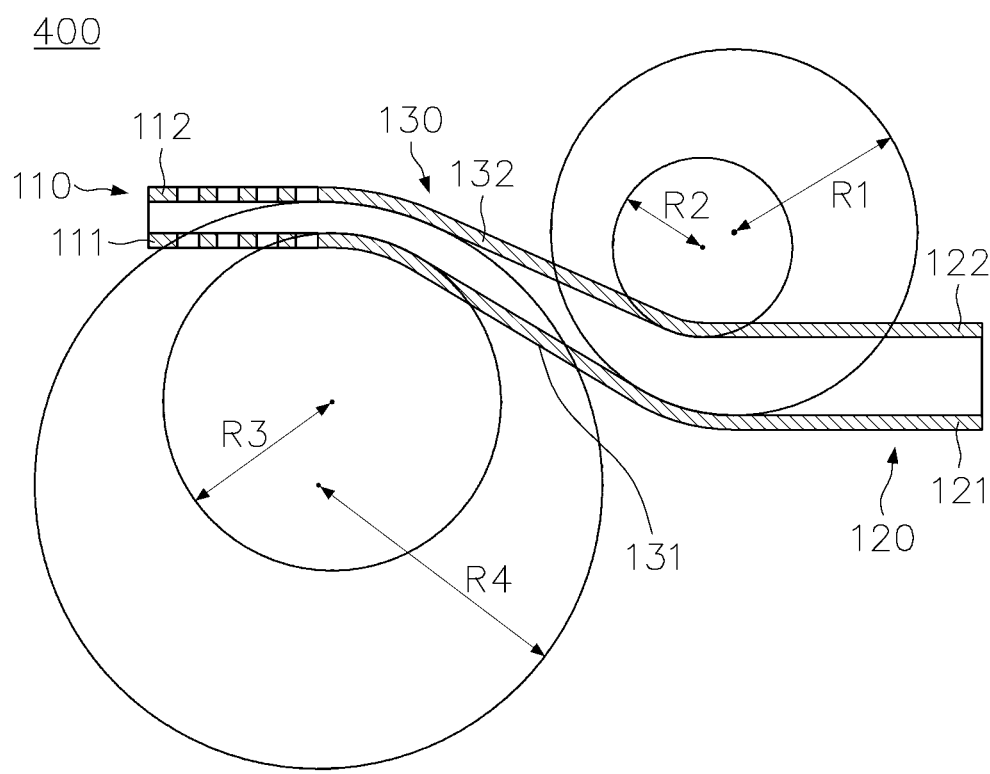
FIG. 8 is a view illustrating an injection nozzle according to a fourth exemplary embodiment.

FIG. 5 is a perspective view illustrating an injection nozzle according to a second exemplary embodiment. FIG. 6 is a perspective view illustrating an injection nozzle according to a third exemplary embodiment. FIG. 7 illustrates cross sections taken along line A-A and line B-B of FIG. 6. FIG. 8 is a view illustrating an injection nozzle according to a fourth exemplary embodiment.

Referring to FIG. 5, in the injection nozzle 200 according to the second exemplary embodiment, the outlet portion 120 has a square cross section. That is, the outlet portion 120 may be formed such that the width W34 in the third and second directions D3 and D4 is the same as the width W12 in the first and second directions D1 and D2.

If the inlet portion 110, the outlet portion 120, and the intermediate portion 130 have a circular cross section, the injection nozzles 100 and 200 cannot be designed such that the intermediate portion 130 is obliquely connected to each of the inlet portion 110 and the outlet portion 120. If the inlet portion, the outlet portion, and the intermediate portion constituting the injection nozzle 100 or 200 are each designed to have a prismatic shape, for example, a parallelepiped shape having a rectangular or square cross section, it is possible to easily manufacture the injection nozzle 100 or 200 in which the intermediate portion 130 is obliquely connected to each of the inlet portion 110 and the outlet portion 120 and the inner width of the intermediate portion 130 gradually increases toward the downstream side. That is, it is possible to reliably obtain the injection nozzle having a desired shape.

Referring to FIGS. 6 and 7, in the injection nozzle 300 according to the third exemplary embodiment, an inner surface of each corner of the cross section of the injection nozzle 300 is rounded when viewed from the direction of the combustion chamber 16. In this case, the flow of the fluid flowing into the injection nozzle 300 may be stabilized.

Referring to FIG. 8, in the injection nozzle 400 according to the fourth exemplary embodiment, a connected portion between the intermediate portion 130 and the inlet portion 110 and a connected portion between the intermediate portion 130 and the outlet portion 120 are formed to have a curved surface. For example, an inner surface of the connected portion between the first intermediate wall 131 and the first outlet wall 121 is curved, and an inner surface of the connected portion between the second intermediate wall 132 and the second outlet wall 122 is curved. In addition, an inner surface of a connected portion between the first intermediate wall 131 and the first inlet wall 112 is curved, and an inner surface of a connected portion between the second intermediate wall 132 and the second inlet wall 112 is also curved.

Here, a radius-of-curvature R1 of the inner surface of the connected portion between the first intermediate wall 131 and the first outlet wall 121 is greater than a radius-of-curvature R2 of the inner surface of the connected portion between the second intermediate wall 132 and the second outlet wall 122. In addition, a radius-of-curvature R3 of the inner surface of the connected portion between the first intermediate wall 131 and the first inlet wall 111 is smaller than a radius-of-curvature R4 of the inner surface of the connected portion between the second intermediate wall 132 and the second inlet wall 112. Considering that the curvature is the reciprocal of the radius of curvature, the curvature of the inner surface of the connected portion between the first intermediate wall 131 and the first outlet wall 121 is smaller than the curvature of the inner surface of the connected portion between the second intermediate wall 132 and the second outlet wall 122, and the curvature of the inner surface of the connected portion between the first intermediate wall 131 and the first inlet wall 111 is greater than the curvature of the inner surface of the connected portion between the second intermediate wall 132 and the second inlet wall 112.

In addition, according to the fourth exemplary embodiment, it is possible to prevent a decrease in the velocity of the fluid when the direction of the fluid is changed in the connected portion between the intermediate portion 130 and the inlet portion 110 and in the connected between the intermediate portion 130 and the outlet portion 120, thereby preventing an anchoring phenomenon or a flash-back phenomenon that may occur due to decrease in the velocity of the fluid in each connected portion.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. An injection nozzle for injecting fuel and compressed air into a combustion chamber of a combustor of a gas turbine, the injection nozzle comprising:
   an inlet portion into which the fuel and the compressed air are introduced;
   an outlet portion disposed downstream of the inlet portion in a flow direction of fluid and configured to discharge the fuel and compressed air to the combustion chamber; and
   an intermediate portion installed between the inlet portion and the outlet portion and connected obliquely to each of the inlet portion and the outlet portion,
   wherein each of the inlet portion, the outlet portion, and the intermediate portion has a prismatic shape,
   wherein the intermediate portion is formed such that a first inner width of the intermediate portion increases continuously toward a downstream end of the intermediate portion from a connected portion between the inlet portion and the intermediate portion to a connected portion between the intermediate portion and the outlet portion,
   wherein a first direction is perpendicular to a flow direction of fluid through the outlet portion, and a second direction is a direction opposite to the first direction, and a third direction is perpendicular to the flow direction of fluid through the outlet portion and perpendicular to the first and second directions, a fourth direction is a direction opposite to the third direction, and wherein the first inner width of the intermediate portion is defined in the first and second directions, and
   wherein a second inner width of the intermediate portion in the third and fourth directions decreases toward the downstream end of the intermediate portion.

2. The injection nozzle according to claim 1, wherein intermediate walls define an inner space of the intermediate portion, the intermediate walls including a first intermediate wall and a second intermediate wall opposite to the first intermediate wall, wherein outlet walls define an inner space of the outlet portion, the outlet walls including a first outlet wall connected to the first intermediate wall and a second outlet wall connected to the second intermediate wall,
   an angle between a first extension line extending from the first outlet wall and the first intermediate wall is greater than an angle between a second extension line extending from the second outlet wall and the second intermediate wall.

3. The injection nozzle according to claim 2, wherein the intermediate portion is inclined from the outlet portion toward the second direction, and the first intermediate wall and the second intermediate wall are a first direction side wall and a second direction side wall of the intermediate portion, respectively.

4. The injection nozzle according to claim 1, wherein the prismatic shape of the outlet portion has a square or rectangular cross section.

5. The injection nozzle according to claim 1, wherein the outlet portion is formed such that a width of the outlet portion in the first and second directions and a width of the outlet portion in the third and fourth directions are different from each other.

6. The injection nozzle according to claim 1, wherein the inlet portion, the outlet portion, and the intermediate portion are each formed such that an inner surface of each corner of a cross section thereof is curved when viewed from downstream end of the injection nozzle.

7. The injection nozzle according to claim 6, wherein the connected portion between the intermediate portion and the inlet portion and the connected portion between the intermediate portion and the outlet portion are each formed to have a curved surface.

8. The injection nozzle according to claim 7, wherein intermediate walls define an inner space of the intermediate portion, the intermediate walls including a first intermediate wall and a second intermediate wall opposite to the first intermediate wall, wherein outlet walls define an inner space of the outlet portion, the outlet walls including a first outlet wall connected to the first intermediate wall and a second outlet wall connected to the second intermediate wall,
   an angle between a first extension line extending from the first outlet wall and the first intermediate wall is greater than an angle between a second extension line extending from the second outlet wall and the second intermediate wall.

9. The injection nozzle according to claim 8, wherein the intermediate portion is inclined from the outlet portion toward the second direction, and the first intermediate wall and the second intermediate wall are a first direction side wall and a second direction side wall of the intermediate portion, respectively.

10. The injection nozzle according to claim 7, wherein the prismatic shape of the outlet portion has a square or rectangular cross section.

11. The injection nozzle according to claim 7, wherein the intermediate portion is inclined from the outlet portion toward the second direction,
wherein intermediate walls define an inner space of the intermediate portion, the intermediate walls including a first intermediate wall and a second intermediate wall opposite to the first intermediate wall, wherein outlet walls define an inner space of the outlet portion, the outlet walls including a first outlet wall connected to the first intermediate wall and a second outlet wall connected to the second intermediate wall, the first intermediate wall and the second intermediate wall are a first direction side wall and a second direction side wall of the intermediate wall, respectively, an inner surface of a connected portion between the first intermediate wall and the first outlet wall is curved, and an inner surface of a connected portion between the second intermediate wall and the second outlet wall is curved.

12. The injection nozzle according to claim 11, wherein a radius-of-curvature of the inner surface of the connected portion between the first intermediate wall and the first outlet wall is greater than a radius-of-curvature of the inner surface of the connected portion between the second intermediate wall and the second outlet wall.

13. A combustor comprising:
a nozzle casing configured to receive compressed air from a compressor and to receive fuel from an outside;
a liner disposed downstream of the nozzle casing in a flow direction of fluid and defining a combustion chamber in which a mixture of the fuel and the compressed air is combusted;
a transition piece disposed downstream of the liner and configured to supply combustion gas generated in the combustion chamber to a turbine; and
an injection nozzle disposed in the nozzle casing to inject the fuel and the compressed air into the combustion chamber,
wherein the injection nozzle comprises:
an inlet portion into which the fuel and the compressed air are introduced;
an outlet portion disposed downstream of the inlet portion in a flow direction of fluid through the injection nozzle and configured to discharge the fuel and compressed air to the combustion chamber; and
an intermediate portion installed between the inlet portion and the outlet portion and connected obliquely to each of the inlet portion and the outlet portion,
wherein each of the inlet portion, the outlet portion, and the intermediate portion has a prismatic shape,
wherein the intermediate portion is formed such that a first inner width of the intermediate portion increases continuously toward a downstream end of the intermediate portion from a connected portion between the inlet portion and the intermediate portion to a connected portion between the intermediate portion and the outlet portion,
wherein a first direction is perpendicular to a flow direction of fluid through the outlet portion, and a second direction is a direction opposite to the first direction, and a third direction is perpendicular to the flow direction of fluid through the outlet portion and perpendicular to the first and second directions, a fourth direction is a direction opposite to the third direction, and wherein the first inner width of the intermediate portion is defined in the first and second directions, and
wherein a second inner width of the intermediate portion in the third and fourth directions decreases toward the downstream end of the intermediate portion.

14. The combustor according to claim 13, wherein the connected portion between the intermediate portion and the inlet portion and the connected portion between the intermediate portion and the outlet portion are each formed to have a curved surface.

15. The combustor according to claim 13, wherein flashback radiant heat from the combustion chamber toward the injection nozzle during operation of the combustor is prevented from reaching the inlet portion, and is returned to the combustion chamber, by being reflected by the intermediate portion.

16. A gas turbine comprising:
a compressor configured to take in air and to compress the air;
a combustor configured to mix fuel with compressed air supplied from the compressor and combust the fuel-air mixture to produce combustion gas; and
a turbine rotated by the combustion gas produced by the combustor to generate electric power,
wherein the combustor comprises:
a nozzle casing;
a liner disposed downstream of the nozzle casing in a flow direction of fluid and defining a combustion chamber in which the fuel-air mixture is combusted;
a transition piece disposed downstream of the liner and configured to supply the combustion gas to the turbine; and
an injection nozzle disposed in the nozzle casing to inject the fuel and the compressed air into the combustion chamber,
wherein the injection nozzle comprises:
an inlet portion into which the fuel and the compressed air are introduced;
an outlet portion disposed downstream of the inlet portion in a flow direction of fluid through the injection nozzle and configured to discharge the fuel and compressed air to the combustion chamber; and
an intermediate portion installed between the inlet portion and the outlet portion and connected obliquely to each of the inlet portion and the outlet portion,
wherein each of the inlet portion, the outlet portion, and the intermediate portion has a prismatic shape,
wherein the intermediate portion is formed such that an inner width of the intermediate portion increases continuously toward a downstream end of the intermediate portion from a connected portion between the inlet portion and the intermediate portion to a connected portion between the intermediate portion and the outlet portion,
wherein a first direction is perpendicular to a flow direction of fluid through the outlet portion, and a second direction is a direction opposite to the first direction, and a third direction is perpendicular to the flow direction of fluid through the outlet portion and perpendicular to the first and second directions, a fourth direction is a direction opposite to the third direction, and wherein the first inner width of the intermediate portion is defined in the first and second directions, and wherein a second inner width of the intermediate portion in the third and fourth directions decreases toward the downstream end of the intermediate portion.

17. The gas turbine according to claim 16, wherein the connected portion between the intermediate portion and the inlet portion and the connected portion between the intermediate portion and the outlet portion are each formed to have a curved surface.

\* \* \* \* \*